(12) United States Patent
Nakahara

(10) Patent No.: US 7,526,192 B2
(45) Date of Patent: Apr. 28, 2009

(54) FOCUS DETECTION METHOD AND FOCUS DETECTION APPARATUS

(75) Inventor: Naoto Nakahara, Saitama (JP)

(73) Assignee: Hoya Corporation, Tokyo (JP)

( * ) Notice: Subject to any disclaimer, the term of this patent is extended or adjusted under 35 U.S.C. 154(b) by 275 days.

(21) Appl. No.: 11/245,045

(22) Filed: Oct. 7, 2005

(65) Prior Publication Data

US 2006/0078323 A1  Apr. 13, 2006

(30) Foreign Application Priority Data

Oct. 7, 2004 (JP) ............................. 2004-295045

(51) Int. Cl.
G03B 3/00 (2006.01)
G03B 13/00 (2006.01)

(52) U.S. Cl. ...................... 396/104; 396/127; 348/349; 348/353

(58) Field of Classification Search ................. 396/104, 396/127; 348/349, 353; G02B 7/36, 7/38, G02B 7/28

See application file for complete search history.

(56) References Cited

U.S. PATENT DOCUMENTS

| 4,300,826 | A | * | 11/1981 | Aoki et al. ................... 396/127 |
| 5,956,528 | A | * | 9/1999 | Tanaka ......................... 396/52 |
| 6,094,223 | A | * | 7/2000 | Kobayashi ................... 348/354 |
| 6,181,378 | B1 | * | 1/2001 | Horie et al. .................. 348/353 |
| 7,158,182 | B2 | * | 1/2007 | Watanabe et al. ............ 348/345 |

| 2003/0081137 | A1 | * | 5/2003 | Yamazaki ................... 348/354 |
| 2004/0202461 | A1 | | 10/2004 | Nakahara |
| 2005/0280734 | A1 | | 12/2005 | Nakahara |
| 2005/0280735 | A1 | | 12/2005 | Nakahara |

FOREIGN PATENT DOCUMENTS

| JP | 02163714 A * | 6/1990 |
| JP | 2001-154083 | 6/2001 |
| JP | 2001-249267 | 9/2001 |

OTHER PUBLICATIONS

English Language Abstract of JP 2001-154083.
English Language Abstract of JP 2001-249267.
U.S. Appl. No. 11/245,034 to Nakahara, filed on Oct. 7, 2005.

* cited by examiner

*Primary Examiner*—W. B. Perkey
*Assistant Examiner*—Linda B Smith
(74) *Attorney, Agent, or Firm*—Greenblum & Bernstein, P.L.C.

(57) ABSTRACT

A focus detection method, for detecting a focus state of an object image in accordance with a contrast of the object image which is formed in a focus detection area, includes capturing the object images while moving a focusing lens group of a photographing lens stepwise within a predetermined range of movement thereof; determining contrast values of the plurality of object images in the focus detection area; and setting a position of the focusing lens group as an in-focus position when a contrast value, attained when the focusing lens group is positioned at one of the closest focus position and the infinite-focus position or at a position within a predetermined range of steps from the one of the closest focus position and the infinite-focus position toward the other of the closest focus position and the infinite-focus position, is at a maximum contrast value.

13 Claims, 10 Drawing Sheets

FOCUS DETECTION METHOD AND FOCUS DETECTION APPARATUS

BACKGROUND OF THE INVENTION

1. Field of the Invention

The present invention relates to a focus detection method a focus detection apparatus for detecting a focus in accordance with the contrast of image data on a captured image.

2. Description of the Prior Art

As a conventional focus detection method for compact AF digital cameras, a contrast detection method for detecting a focus in accordance with the contrast of data on a captured image is known in the art. Conventional focus detection apparatuses using the contrast detection method operate to determine the position of a focusing lens group in which contrast of an object image (image data) which is captured by an image pickup device by repeating an image capturing operation while moving the focusing lens group between an infinite focus position and a closest focus position becomes maximum. Therefore, in such conventional focus detection apparatuses, an image capturing operation is performed successively at different positions of the focusing lens group while the focusing lens group is driven stepwise from the infinite (longest) focus position (position for bringing an object at infinity into focus) to the closest (shortest) focus position to obtain a contrast from a captured image signal at each different position of the focusing lens group, and a maximum value (peak value) of contrast among the contrast values obtained at the aforementioned different positions of the focusing lens group is determined so that the focusing lens group is driven to a position thereof where the maximum contrast value is obtained to bring the object into focus. Such a focus detection apparatus is disclosed in, e.g., Japanese Unexamined Patent Publication No. 2001-249267.

However, according to such a conventional focus detection method, in the case where an object to be photographed is located at, e.g., at a closest focusing distance (closest focusing position) or in the close vicinity thereof, a peak contrast value of an image of the object sometimes cannot be detected as a peak contrast value even though the peak contrast value exists at the close-distance position or in the vicinity thereof. In such a case, according to a conventional focus detection method, it is determined that it is impossible to detect a peak contrast value, and a focus is set at a predetermined fixed point. Therefore, in this case, an intended object to be photographed which is located at the closest focusing distance becomes out-of-focus.

SUMMARY OF THE INVENTION

The present invention has been devised in view of the above described problem in the conventional contrast detection method, and provides an improved focus detection method which makes it possible to reduce the chance of defocusing occurring even if an object to be photographed is a low-contrast object at a close distance closer than the shortest object distance.

According to an aspect of the present invention, a focus detection method is provided, for detecting a focus state of an object image in accordance with a contrast of the object image which is formed in a focus detection area, the focus detection method including capturing a plurality of the object images while moving a focusing lens group of a photographing lens stepwise within a predetermined range of movement of the focusing lens group; determining contrast values of the plurality of object images in the focus detection area; and setting a position of the focusing lens group as an in-focus position when a contrast value, attained when the focusing lens group is positioned at one of the closest focus position and the infinite-focus position or at a position within a predetermined range of steps from the one of the closest focus position and the infinite-focus position toward the other of the closest focus position and the infinite-focus position, is at a maximum contrast value.

It is desirable for the focus detection method to include determining whether or not a contrast value among the contrast values of the plurality of object images, which are determined when the focusing lens group is moved stepwise in a predetermined direction, is a peak contrast value, wherein the contrast values increase a first predetermined number of times consecutively and subsequently decrease a second predetermined number of times consecutively. In the case where the peak contrast value is not detected, the focusing lens group is moved to the focusing lens group position determined when the contrast value, attained when the focusing lens group is positioned at one of the closest focus position and the infinite-focus position or at a position within a predetermined range of steps from the one of the closest focus position and the infinite-focus position toward the other of the closest focus position and the infinite-focus position, is at a maximum contrast value.

It is desirable for the peak contrast value determining step to include detecting whether or not a contrast value among the contrast values of the plurality of object images, which are determined when the focusing lens group is moved stepwise in a predetermined direction, is a peak contrast value wherein the contrast values increase a first predetermined number of times consecutively and subsequently decrease a second predetermined number of times consecutively.

When determining whether or not the peak contrast value exists during movement of the focusing lens group from the closest focusing position to an infinite focusing position, it is desirable for the focus detection method to further include determining whether any of the contrast values determined at the closest focusing position and a position a predetermined distance away from the closest focusing position toward the infinite focus position corresponding to an amount less than the first predetermined number of times is the maximum contrast value when no peak contrast value can be determined.

When determining whether or not the peak contrast value exists during movement of the focusing lens group from an infinite focusing position to the closest focusing position, it is desirable for the focus detection method further to include determining whether any of the contrast values determined at the closest focusing position and a position a predetermined distance away from the closest focusing position toward the infinite focus position corresponding to an amount less than the first predetermined number of times is the maximum contrast value when no the peak contrast value can be determined.

In the case where the first predetermined number of times is two, it is desirable for the focusing detection method to further include determining that the maximum contrast value is valid when determining that the any of the contrast values is the maximum contrast value if a ratio between the maximum contrast value and a contrast value determined at a position of the focusing lens group two steps away from the focusing lens group position at which the maximum contrast value is attained toward the closest focus position, is smaller than a predetermined value.

The focus detection method can further include visually indicating that an in-focus state is not achieved when moving the focusing lens group to the position at which the maximum contrast value is determined.

The focus detection method can further include visually indicating that an in-focus state is achieved if determining the maximum contrast value at a position of the focusing lens group closer to the infinite focus position than the closest focusing position and if determining that the maximum contrast value is valid.

The focus detection area can be selected from a plurality of focus detection areas.

An out-of-focus state can be visually indicated by a light emitter in the case where an in-focus state is not achieved. Alternatively, an out-of-focus state can be visually indicated on a display device in the case where an in-focus state is not achieved.

It is desirable for the contrast values of the object image to be measured via an image pickup device.

In an embodiment, a focus detection method is provided, for detecting a focus state of an object image in accordance with a contrast of the object image which is formed in a focus detection area, the focus detection method including capturing a plurality of the object images while moving a focusing lens group of a photographing lens stepwise within a predetermined range of movement of the focusing lens group; determining contrast values of the plurality of object images in the focus detection area; determining whether or not a contrast value among the contrast values of the plurality of object images, which are determined when the focusing lens group is moved stepwise in a predetermined direction, is a peak contrast value wherein the contrast values increase a first predetermined number of times consecutively and subsequently decrease a second predetermined number of times consecutively; and moving the focusing lens group to a position thereof in which the maximum contrast value is determined if it is determined that the contrast value among the contrast values, which is determined when the focusing lens group is located the one of at the closest focusing position and in the close vicinity thereof, is the maximum contrast value, in the case where the peak contrast value is not detected.

In an embodiment, a focus detection apparatus is provided, for detecting a focus state of an object image in accordance with a contrast of the object image which is formed in a focus detection area, the focus detection apparatus including a lens drive mechanism for moving a focusing lens group of a photographing lens system within a predetermined range of movement; an image-capturing device for capturing a plurality of the object images while moving the focusing lens group of a photographing lens stepwise within a predetermined range of movement of the focusing lens group; a contrast value determining device for determining a plurality of contrast values of the plurality of object images in the focus detection area; and a controller for detecting whether or not a contrast value among the contrast values of the plurality of object images, which are determined when the focusing lens group is moved stepwise in a predetermined direction, is a peak contrast value. If the peak contrast value is not detected, the controller moves the focusing lens group to a position thereof in which a maximum contrast value is determined if it is determined that a contrast value among the plurality of contrast values, which is determined when the focusing lens group is located the one of at the closest focusing position and in the close vicinity thereof, is the maximum contrast value.

According to the present invention, if the peak contrast value is not detected, since the focusing lens group is moved to a position thereof in which the maximum contrast value is determined if it is determined that the contrast value among the contrast values, which is determined when the focusing lens group is located the one of at the closest focusing position and in the close vicinity thereof, is the maximum contrast value, even if an object to be photographed is located at a closest focal distance or in the vicinity thereof, this object can be brought to an in-focus state or brought close thereto. Consequently, the chances of losing photo opportunity at the right moment are reduced.

The present disclosure relates to subject matter contained in Japanese Patent Application No. 2004-295045 (filed on Oct. 7, 2004) which is expressly incorporated herein in its entirety.

BRIEF DESCRIPTION OF THE DRAWINGS

The present invention will be discussed below in detail with reference to the accompanying drawings, in which.

DESCRIPTION OF THE PREFERRED EMBODIMENT

Figure 1:
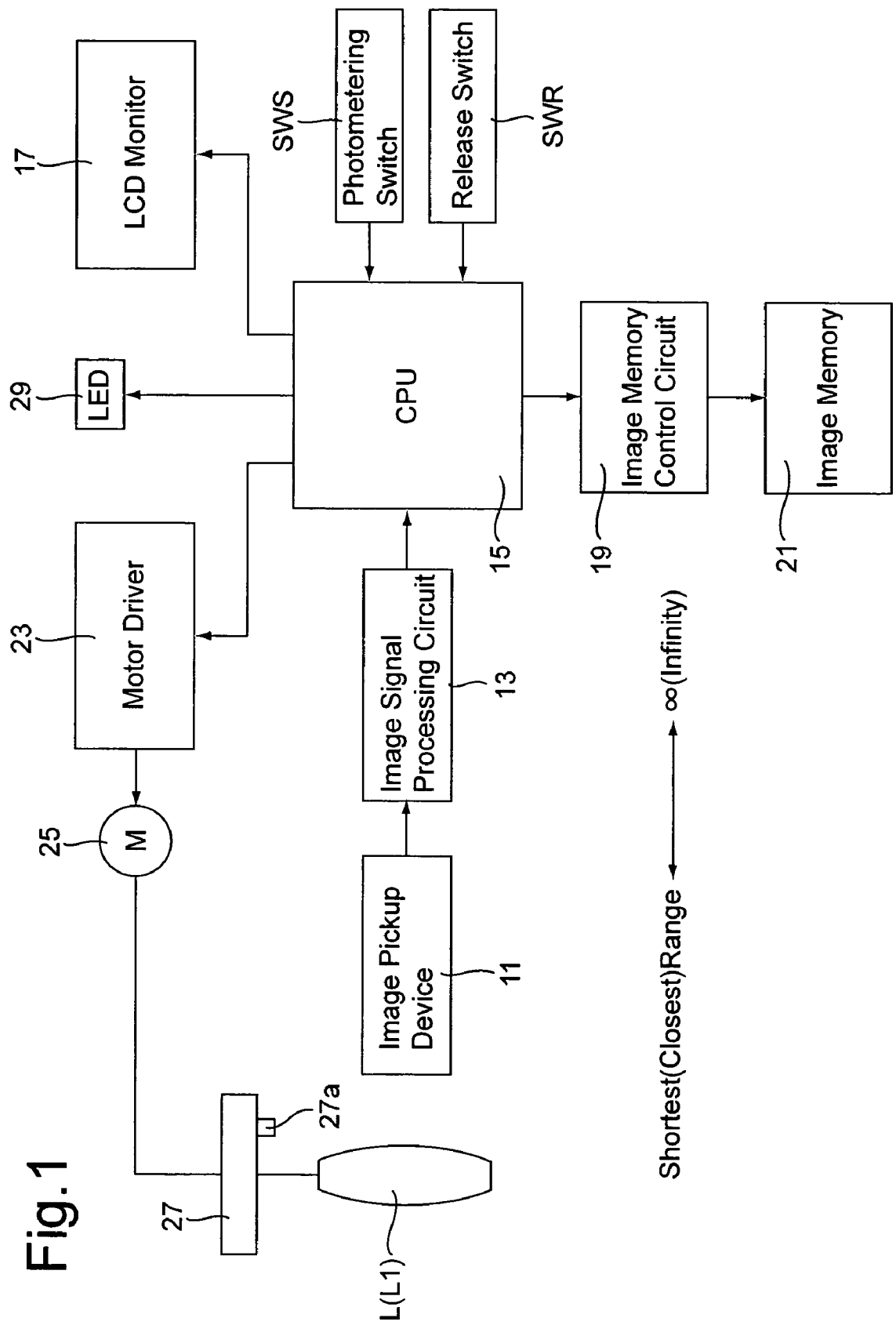
FIG. 1 is a block diagram of an embodiment of a digital camera to which the present invention is applied, showing a basic configuration of the digital camera.

FIG. 1 is a block diagram of an embodiment of a digital camera to which the present invention is applied.

The digital camera is provided with a photographing lens L including a focusing lens group L1, and an image pickup device (CCD image sensor) 11 serving as an imaging device. An object image is formed on a light receiving surface 12 (see FIG. 2) of the image pickup device 11 via the photographing lens L. The image pickup device 11 includes a large number of pixels (photoelectric transducing elements/photo diodes) arranged in a two-dimensional matrix at predetermined intervals. The digital camera is further provided with an image signal processing circuit 13, a CPU (controller) 15, an LCD monitor (display device) 17, an image memory control circuit 19, an image memory 21, a motor driver 23, an AF motor 25 and a lens drive mechanism 27. Each pixel of the image pickup device 11 converts the incident light of an object image thereon into an electrical charge, and the electrical charges is accumulated (integrated). Upon completion of an exposure, the accumulated charges are output, pixel by pixel, as an image signal to the image signal processing circuit 13. The image signal processing circuit 13 performs predetermined adjusting processes such as a white-balance adjusting process and an A/D converting process on the input image signal to output digital image data to the CPU 15. Namely, predetermined processes are performed on the input image signal in the image signal processing circuit 13, and the image data which is digitized into pixel data is output to the CPU 15. The CPU 15 converts the input image data into an image signal capable of being indicated on the LCD monitor 17 to visually indicate the image data on the LCD monitor 17 in a through mode (monitoring mode), and converts the input image data into image data having a predetermined format to write this image data into the image memory 21 via the image memory control circuit 19. The digital camera is provided with an LED 29 (see FIG. 1) serving as a focus state indicator for indicating whether or not an in-focus state is achieved. For instance, the LED 29 illuminates green (or blue) when focus is achieved, and illuminates red (or blinks green (or blue)) when focus is not achieved.

Figure 2:
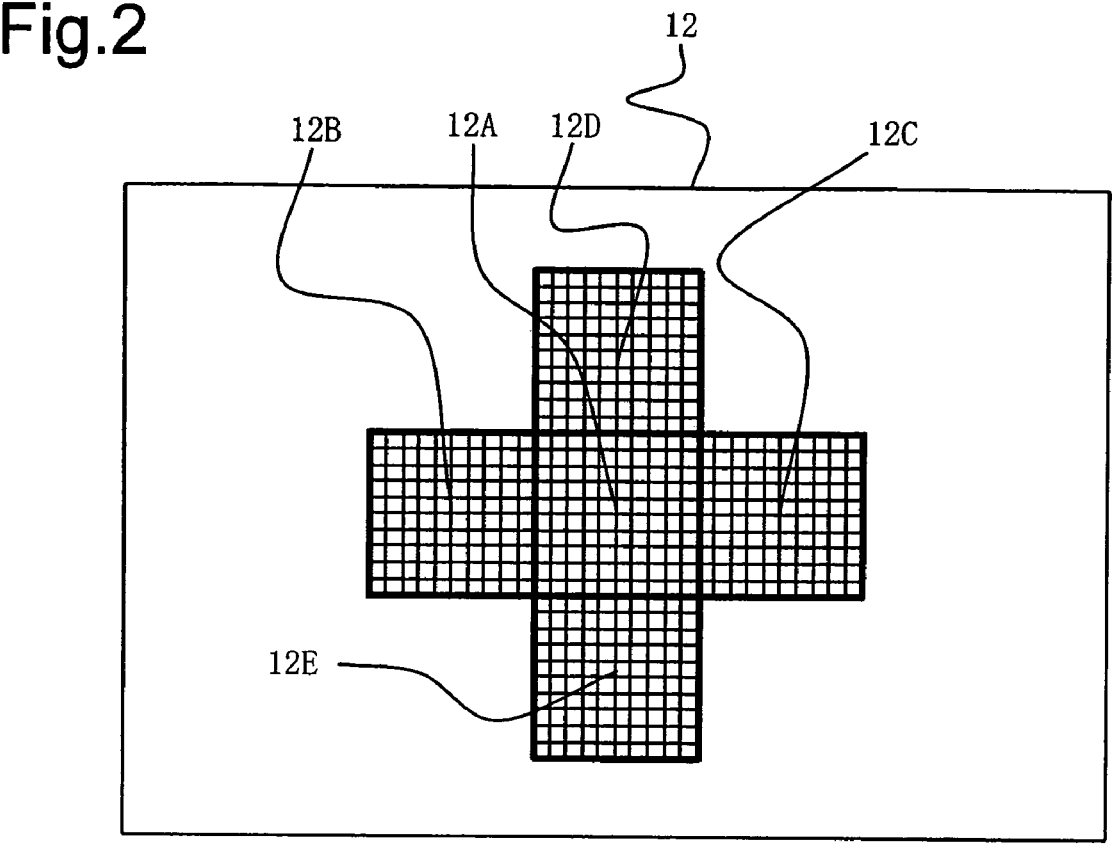
FIG. 2 is a diagrammatic illustration showing the relative position between a light receiving surface of an image pickup device and five focus detection areas on the light receiving surface in the digital camera shown in FIG. 1.
Figure 3:
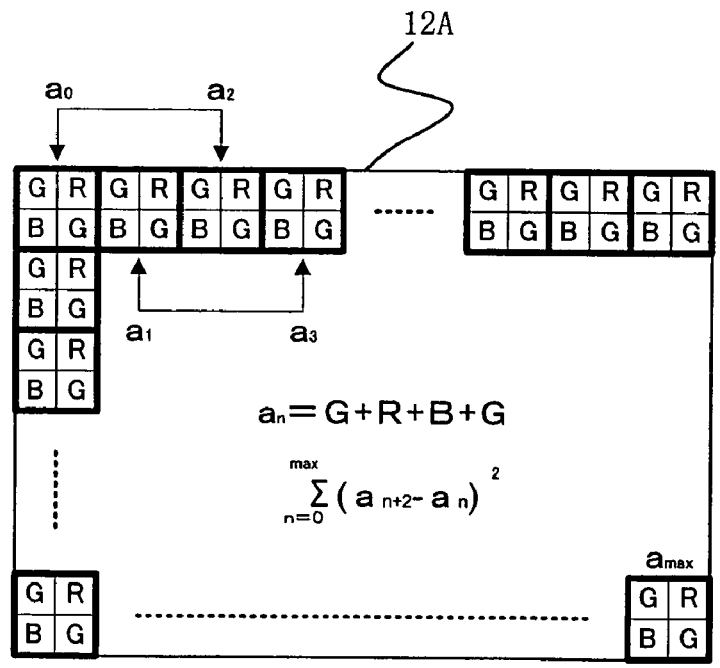
FIG. 3 is a diagrammatic illustration showing the arrangement of primary-color filters of the image pickup device.

FIG. 2 shows the relative position between the light receiving surface 12 of the image pickup device 11 and five focus detection areas: first through fifth focus detection areas 12A, 12B, 12C, 12D and 12E, arranged on the light receiving surface 12 in the shape of a cross, by way of example. FIG. 3 is an enlarged view of the first (central) focus detection area 12A. Each of the remaining four focus detection areas 12B through 12E has the same structure as the first focus detection area 12A, and accordingly, only the first focus detection area 12A is shown in FIG. 3. The first focus detection area 12A is positioned at substantially the center of the light receiving surface 12, the second and third focus detection areas 12B and 12C are positioned on laterally opposite sides of the first focus detection area 12A, and the fourth and fifth focus detection areas 12D and 12E are positioned on vertically opposite sides of the first focus detection area 12A. Primary-color filters (red (R), green (G) and blue (B) filters) are disposed in front of each pixel (photoelectric transducing element) on the object side thereof, and each pixel on the light receiving surface 12 transduces the red, green and blue components of the incident rays of object light that are passed through the primary-color filters into electrical charges, and these electrical charges are accumulated. The electrical charges thus accumulated for a predetermined period of time are read out of the image pickup device 11 pixel by pixel to be output as an image signal.

FIG. 3 shows a typical arrangement of primary-color filters. The primary-color filters include horizontal GR lines, each of which green filters and red filters are horizontally arranged in alternative order, and horizontal BG lines, each of which blue filters and green filters are horizontally arranged in alternative order, so that the GR lines and the BG lines are vertically arranged in alternative order. In the illustrated embodiment of the digital camera, four pixels (a 2 by 2 matrix of pixels) in each square, namely, a combination of two green filters, a red filter and a blue filter, is treated as one pixel block, and the sum of the magnitudes of image signals integrated by the four pixels in each pixel block is regarded as intensity $a_n$ ($a_n$=G+R+B+G).

Accordingly, an operation for determining the difference between the intensity $a_n$ of a pixel block and the intensity $a_n$ of another pixel block positioned one pixel-block away from the previous pixel block in the horizontal direction is repeated successively in the horizontally rightward direction within the first focus detection area 12A while the differences thus determined ($a_{n+2}-a_n$) are added up. Upon completion of this difference determining and adding operations on the pixel block at the right end of the first focus detection area 12A in the horizontal direction, the difference determining and adding operations are repeated on a subsequent row of pixel blocks one pixel block below the previous row of pixel blocks in the vertical direction until completion of the determining operation on the pixel block at the right end of the first focus detection area 12A in the horizontal direction and completion of the adding operation thereof. Such difference determining and adding operations are repeated on all the pixel blocks in the first focus detection area 12A. Subsequently, the same operations are performed on each of the remaining four focus detection areas 12B through 12E.

The sum of the differences ($a_{n+2}-a_n$) on each of the first through fifth focus detection areas 12A through 12E corresponds to the contrast value on the focus detection area at the current position of the focusing lens group L1. The contrast value can be represented by the following expression 1:

$$\sum_{n=0}^{max} (a_{n+2} - a_n)^2 \qquad \text{[Expression 1]}$$

In a contrast AF process (see FIG. 4) performed by the CPU 15, the CPU 15 performs an image capturing operation on the image pickup device 11 while moving the focusing lens group L1 stepwise via the motor driver 23, the AF motor 25 and the lens drive mechanism 27; inputs the image signals from the first through fifth focus detection areas 12A through 12E to determine the contrast values on the first through fifth focus detection areas 12A through 12E, respectively; and stores the determined contrast values in an internal RAM of the CPU 15 as contrast data. The CPU 15 repeats the contrast AF process while moving the focusing lens group L1 stepwise in the direction from one end to the other end within the range of movement of the focusing lens group L1, i.e., from the closest (shortest) focus position (minimum focusing range position) to the infinite focus position (position for bringing an object at infinity into focus).

In the present embodiment of the digital camera, the position of the focusing lens group L1 is detected by an origin sensor 27a with the closest (shortest) focus position of the focusing lens group L1 being regarded as a point of origin, and is counted as the number of driving pulses from the point of origin. The driving pulses are defined as, e.g., pulses output from an encoder such as a photo-interrupter installed on the output shaft of the AF motor 25. Although several hundreds of pulses or more are usually necessary for driving the focusing lens group L1 from the closest (shortest) focus position to the infinite focus position, it is assumed that several pulses or several dozen pulses are only necessary for driving the focusing lens group L1 in a stepwise manner from the closest (shortest) focus position to the infinite focus position in the contrast AF process in the present embodiment of the digital camera. In addition, in the driving pulses used in the contrast AF process in the present embodiment of the digital camera, it is assumed that one driving pulse constitutes more than one pulse output from the aforementioned photo-interrupter.

Immediately after contrast data at each of the plurality of lens positions from the closest (shortest) focus position to the infinite focus position is obtained, contrast data at two adjacent lens positions of the focusing lens group L1 are compared with each other successively at consecutive lens positions in a direction of movement of the focusing lens group L1, e.g., in a direction from a position of the focusing lens group L1 on the close-distance range side to a position of the focusing lens group L1 on the long-distance side, to determine whether the contrast value increases successively a predetermined number of times and subsequently decreases successively a predetermined number of times. More specifically, in the present embodiment of the digital camera, it is determined whether the contrast value increases two times consecutively, and subsequently decreases two times consecutively in a group of contrast data (obtained contrast values) at consecutive five lens positions from the close-distance side or the long-distance side so as to determine a peak contrast value. In other words, it is determined whether the contrast data of the third (middle) lens position of the five lens positions is a peak contrast value or not. The same determining operation is performed successively on another group of contrast data at consecutive five lens positions which are shifted one by one toward either the long-distance side or the close-distance side with respect to the previous five lens positions. If it is determined that the contrast value increases two times consecutively and subsequently decreases two times consecutively, it is determined whether the reliability of a peak contrast value thereof is high (i.e., whether this peak contrast value is higher than the peak contrast value of the previous five lens positions). It is determined that a precise peak contrast value exists only when the reliability thereof is high.

Additionally, in the present embodiment of the digital camera, if it is determined that there is no peak contrast value having high reliability, it is determined whether the contrast value increases two times consecutively and subsequently decreases two times consecutively on a group of contrast data (obtained contrast values) at consecutive five lens positions from either the close-distance side or the long-distance side to detect a precise peak contrast value, similar to the above described manner. In this manner, a lens position of the focusing lens group L1 in which at least a predetermined number of peak values exists at the same position of the focusing lens group L1 is detected out of the peak contrast values determined on all the five focus detection areas. Thereafter, a more precise position of the focusing lens group L1 is determined from two contrast data positioned on the opposite sides of each peak contrast value by an approximate (interpolation) calculation, and the focusing lens group L1 is moved to a lens position thereof corresponding to an average of the determined precise positions of the focusing lens group L1. Thereupon, the LED 29 is activated to illuminate (or blink) in a manner such as described above to visually indicate that an in-focus state is not achieved.

Accordingly, according to the present embodiment of the focus detection method, peak contrast values are determined regardless of the reliability thereof when no precise peak contrast value having high reliability can be determined. Subsequently, if at least a predetermined number of peak contrast values exists at the same position of the focusing lens group L1, it is assumed that an in-focus point exists at or in the vicinity of this position of the focusing lens group L1, this process being a feature of the present invention.

Figure 4:
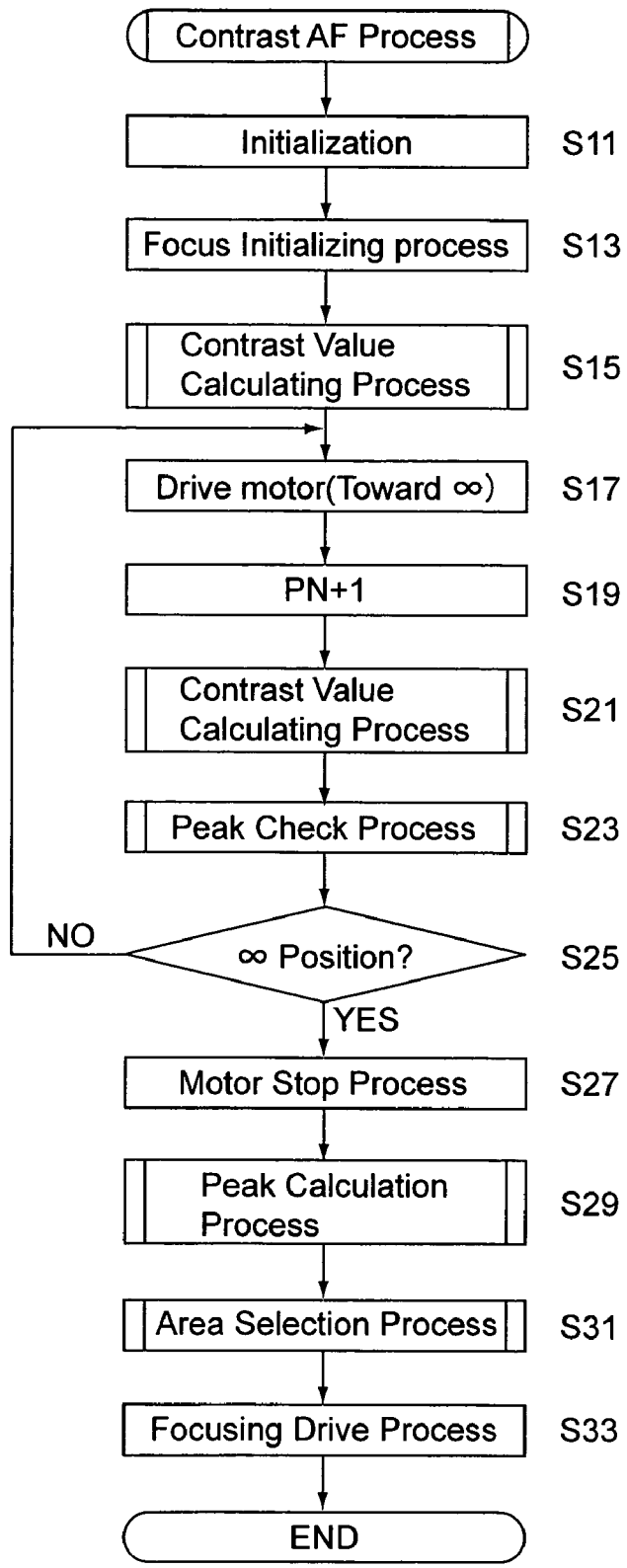
FIG. 4 is a flow chart showing a contrast AF process performed in the digital camera shown in FIG. 1.
Figure 8:
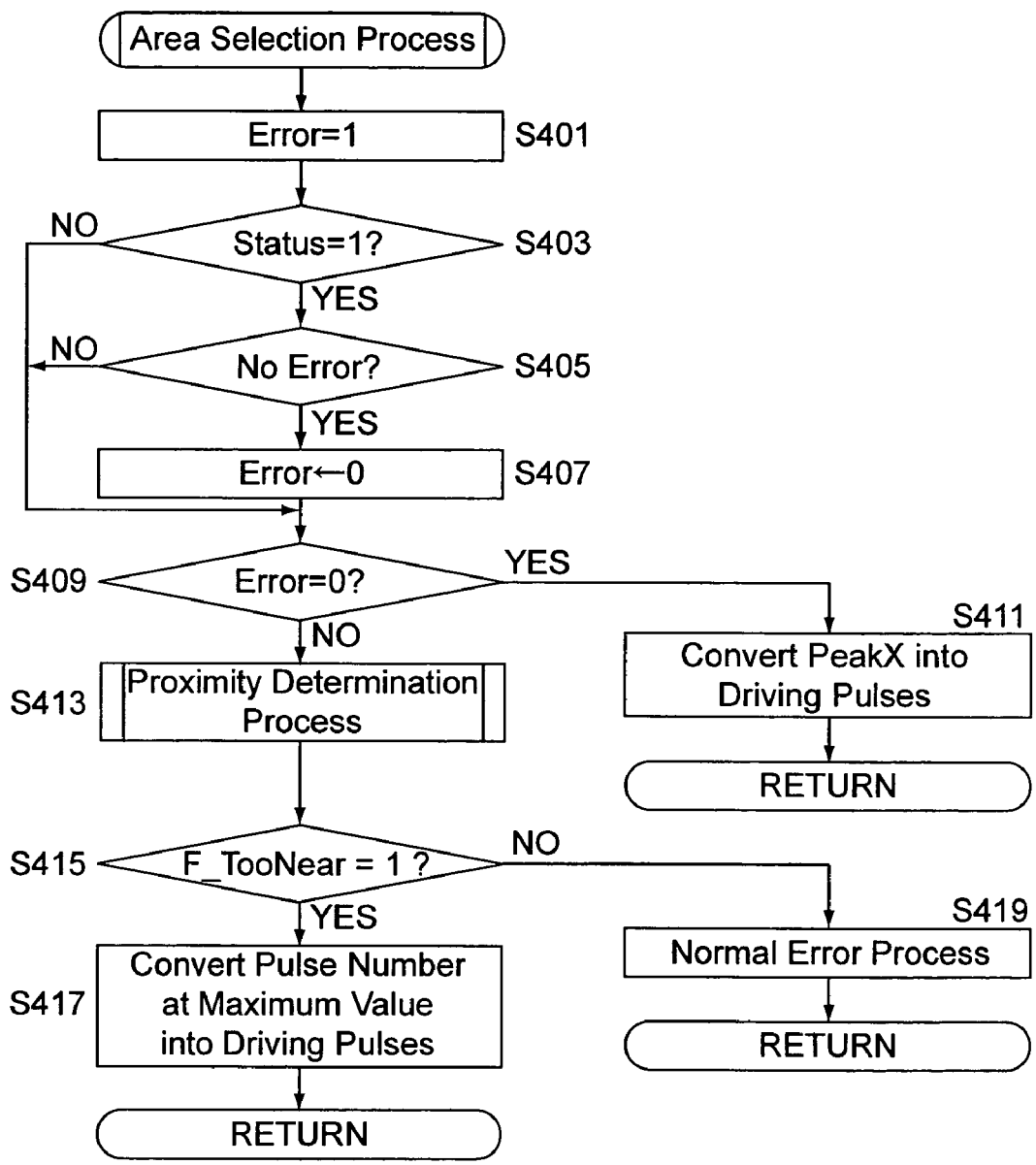
FIG. 8 is a flow chart showing a sub-routine "Area Selection Process" performed in the contrast AF process shown in FIG. 4.
Figure 9:
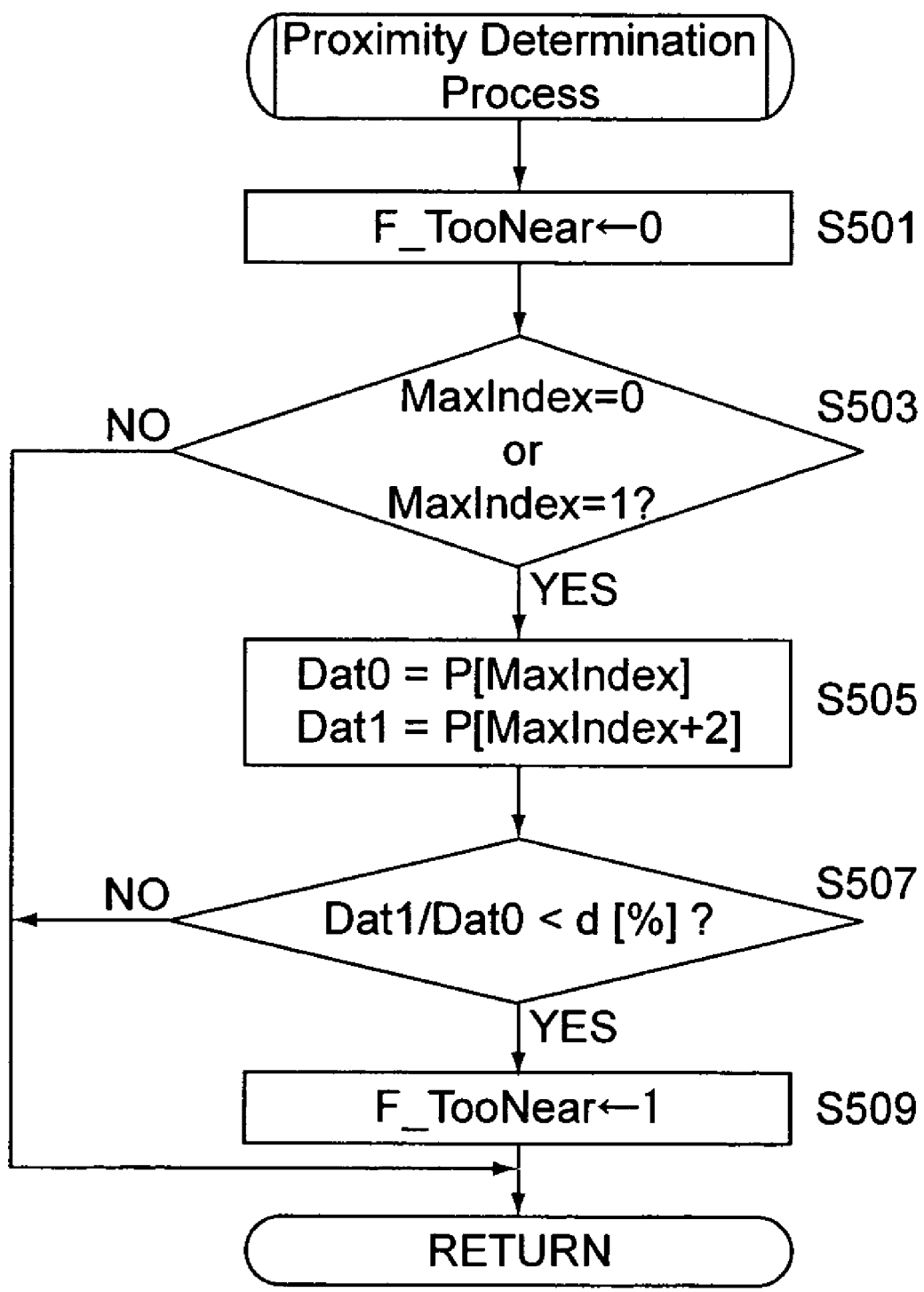
FIG. 9 is a flow chart showing a sub-routine "Proximity Determination Process" performed in the area selection process shown in FIG. 8.
Figure 10A:
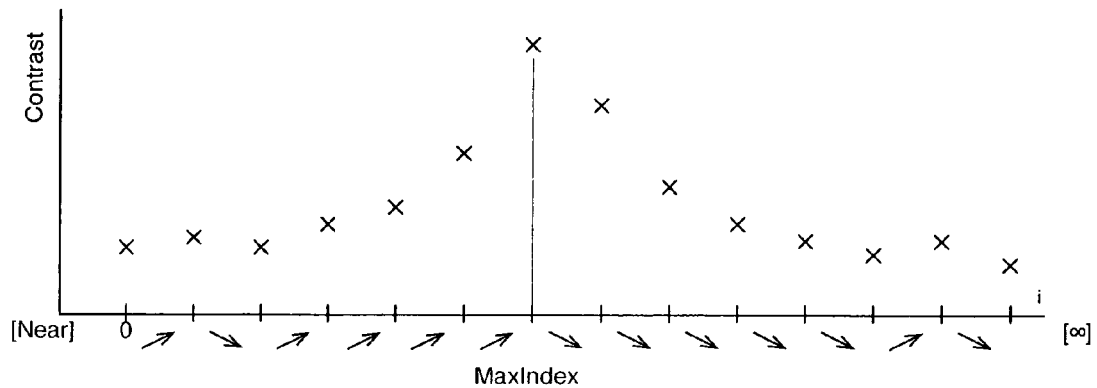
FIGS. 10A, 10B and 10C show graphs each showing a relationship between the position of a focusing lens group and contrast data according to a contrast detection method.
Figure 10B:
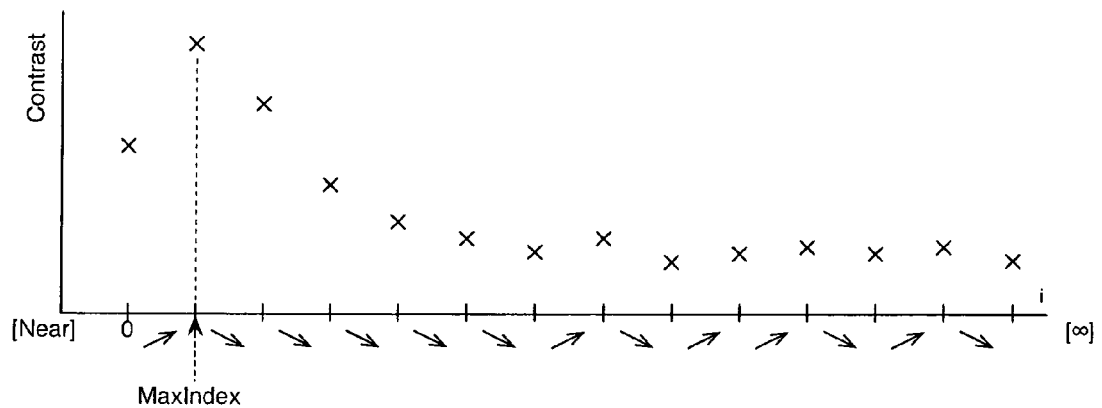
Figure 10C:
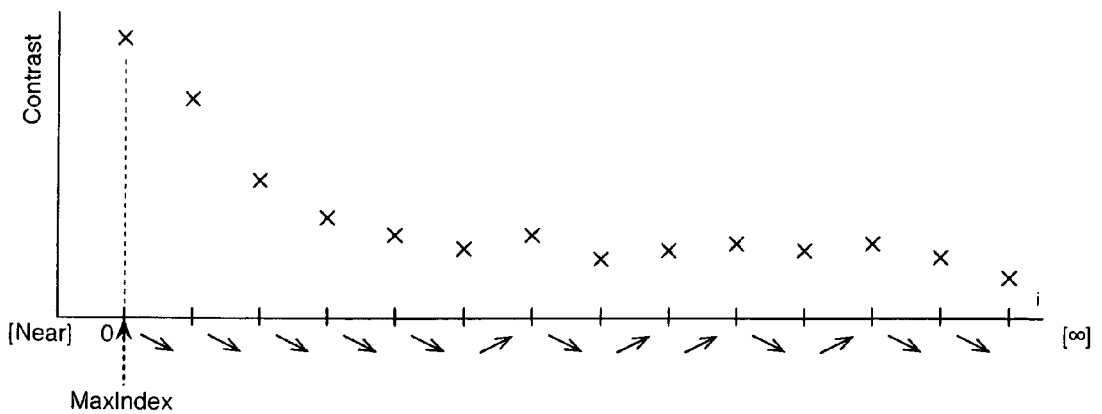

The contrast AF process that is performed in the present embodiment of the digital camera will be discussed in detail with reference to flow charts shown in FIGS. 4 through 9, graphs shown in FIGS. 10A, 10B and 10C, each of which shows a relationship between the position of the focusing lens group L1 and contrast data according to a contrast detection method, and graphs shown in FIGS. 11A through 11D, each of which illustrates the linear approximation of a peak contrast value in the contrast AF process shown in FIG. 4. In this particular embodiment, immediately after the photometering switch SWS is turned ON, control enters the contrast AF process shown in FIG. 4 to carry out the contrast AF process only once. Namely, the contrast AF process shown in FIG. 4 is a one-shot AF process.

In the contrast AF process, firstly various variables and the like are initialized (step S11). For instance, each flag is cleared, contrast values are cleared, a lens position (pulse number) PN is initialized (PN=0), the maximum contrast value is set to zero, the minimum contrast value is set to FFFFFFFF, and the number of focus detection areas to be used is selected according to the focal length of the photographing lens L in the present embodiment of the digital camera. The lens position PN is a variable which is increased by one every time the focusing lens group L1 moves toward the infinite focus position by one pulse, wherein the lens position PN is zero when the focusing lens group L1 is in the closest (shortest) focus position. Note that the aforementioned number of focus detection areas to be used is selected from among predetermined different numbers according to the focal length of the photographing lens L to calculate the contrast value.

Upon completion of the initializing process at step S11, a focus initializing process is performed (step S13). In the focus initializing process, the focusing lens group L1 is moved to one of the opposite ends of the moving range of the focusing lens group L1, specifically to the closest (shortest) focus position in this particular embodiment. The origin sensor 27a detects whether or not the focusing lens group L1 reaches the closest (shortest) focus position.

Thereafter, a contrast value calculating process (see FIG. 5) is performed to calculate a contrast value P[PN] at the current position of the focusing lens group L1, i.e., the closest (shortest) focus position thereof (step S15). Namely, a contrast value P[0] when the focusing lens group L1 is positioned at the closest (shortest) focus position is calculated in accordance with the image data input from the image pickup device 11, and each of the peak contrast value and the minimum contrast value is updated.

A motor driving process in which the AF motor 25 is driven stepwise in a direction to move the focusing lens group L1 toward the infinite focus position is started (step S17). Namely, the focusing lens group L1 is made to start moving stepwise, in increments of one lens position PN, in a direction from the closest (shortest) focus position to the infinite focus position. Subsequently, the lens position PN is increased by one (step S19).

Subsequently, a contrast value calculating process is performed wherein the contrast value P[PN] is calculated in accordance with the image data input from the image pickup device 11, and each of the peak contrast value and the minimum contrast value is updated (step S21). Subsequently, a peak check process (see FIG. 6) which determines whether the contrast value P[PN] calculated at step S21 is a peak contrast value which satisfies predetermined conditions (step S23). The contrast value calculating process at step S21 and the peak check process at step S23 are performed on all the five focus detection areas 12A through 12E. Note that an area 0, an area 1, an area 2, an area 3 and an area 4 represent the focus detection areas 12A through 12E, respectively, in the following description.

Upon completion of the operation at step S23, it is determined whether the focusing lens group L1 has reached the infinite focus position (step S25). If it determined that the focusing lens group L1 has not yet reached the infinite focus position (if NO at step S25), control returns to step S17 so that the operations at steps S17 through S23 are repeated while the focusing lens group L1 is driven stepwise, in increments of one pulse, toward the infinite focus position. This process in which the peak check process is performed each time the focusing lens group L1 is driven stepwise in increments of one lens position PN makes it possible to reduce the processing time by a greater degree than the case where the peak check process is performed once, after the contrast values are obtained over the full range of movement of the focusing lens group L1 by driving the focusing lens group L1 from the closest focus position to the infinite focus position.

If the stepwise driving of the focusing lens group L1 is performed immediately after the readout of the image data from the image pickup device 11, and if the contrast value calculating process S21 and the peak check process S23 are performed during the stepwise driving of the focusing lens group L1, the processing time can be reduced, or the effective integral action time can be extended in a state where the focusing lens group L1 is at rest.

Immediately after the focusing lens group L1 reaches the infinite focus position after the completion of the contrast value calculating process at step S21 and the peak check process at step S23 (if YES at step S25), the AF motor 25 is stopped (step S27). Subsequently, a peak check process (see FIG. 7) for calculating a peak contrast value (by linear approximation) on each focus detection area is performed in accordance with the contrast values (a group of contrast data (five including peak contrast values) at consecutive five lens positions which are obtained in the loop process at steps S17 through S25 (step S29). Namely, a peak contrast value which is presumed to be a precise peak contrast value is determined by an interpolation calculation since there is a possibility of a real peak contrast value existing in the vicinity of a peak contrast value among the contrast values which are respectively determined at stepwise positions. In the present embodiment of the focus detection method, a point of intersection is determined between two straight lines (two linear approximation expressions): a straight line which passes through the points of two contrast values among the detected contrast values which are obtained on one of the opposite sides (e.g., the close-distance side) of a peak contrast value and another straight line which passes through the points of another two contrast values among the detected contrast values which are obtained on the other side (e.g., the infinite range side) of the peak contrast value. This point of intersection is assumed to correspond to a more precise peak contrast value.

Subsequently, an area selection process (see FIG. 8) is performed (step S31). In the area selection process, one of the five focus detection areas 12A through 12E in which a peak contrast value at the closest distance is obtained is selected as an in-focus area in accordance with the peak contrast values obtained at each focus detection area (step S31). Thereupon, the focusing lens group L1 is moved to the focus position of the selected focus detection area 12A, 12B, 12C, 12D or 12E to bring an object into focus (step S33), which ends the contrast AF process.

[Contrast Value Calculating Process]

Figure 5:
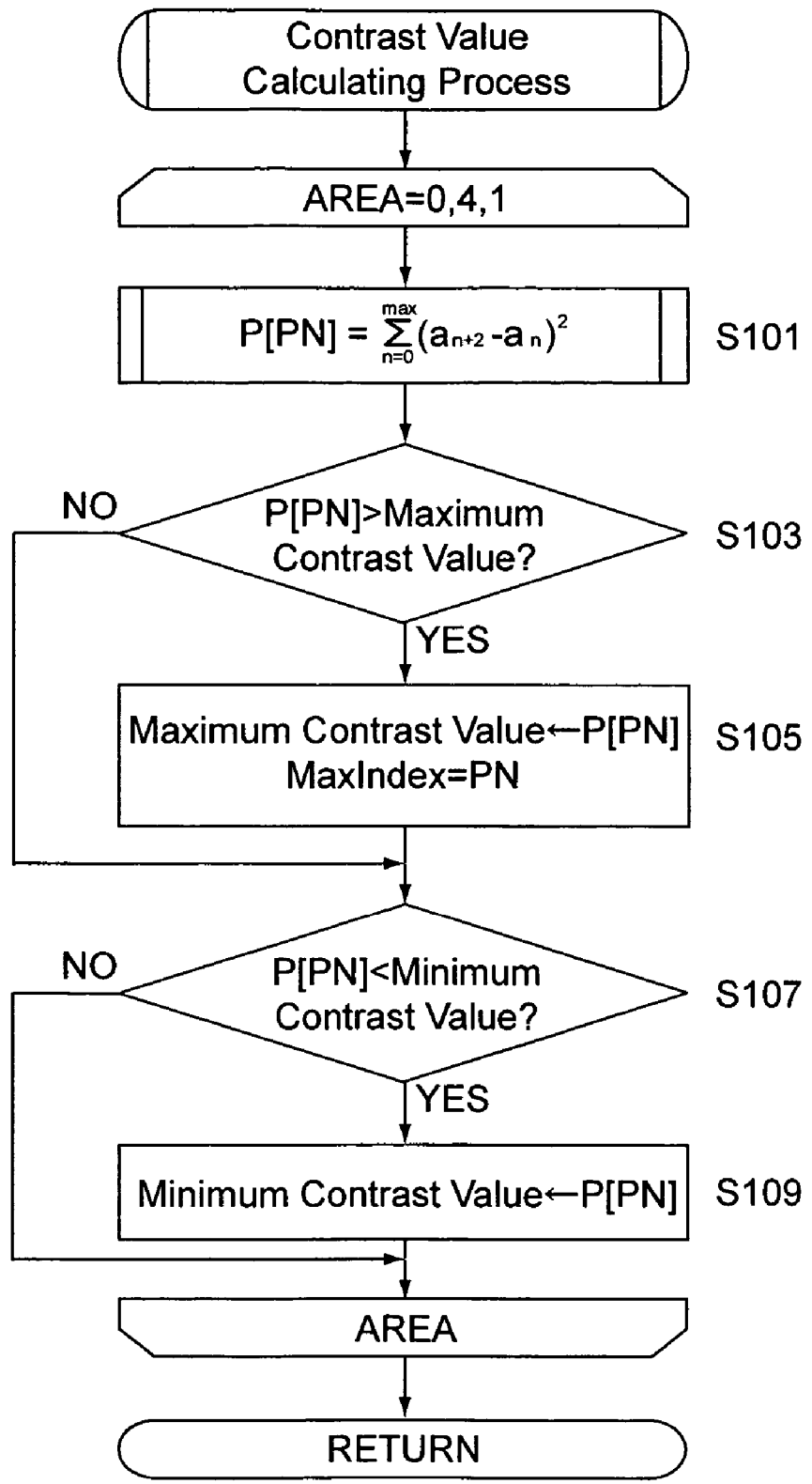
FIG. 5 is a flow chart showing a sub-routine "Contrast Value Calculating Process" performed in the contrast AF process shown in FIG. 4.

The contrast value calculating process that is performed at each step S15 and S21 will be hereinafter discussed with reference to the flow chart shown in FIG. 5. The contrast value calculating process is performed on each of the five focus detection areas 12A through 12E (the five areas 0 through 4).

In the contrast value calculating process, firstly the contrast value P[PN] is determined by the following expression 2 from the contrast data obtained at each lens position of the focusing lens group L1 (lens position (pulse number) PN) by moving the focusing lens group L1 stepwise (step S101):

$$P[PN] = \sum_{n=0}^{max} (a_{n+2} - a_n)^2 \quad \text{[Expression 2]}$$

Subsequently, the contrast value P[PN] is compared with the maximum value among all the contrast values obtained so far (step S103), and if the contrast value P[PN] is greater than this maximum value (if YES at step S103), the maximum value is set to this contrast value P[PN] and the lens position PN is set to a maximum value position index MaxIndex (step S105). Subsequently, the contrast value P[PN] is compared with the minimum value among all the contrast values obtained so far (step S107), and if the contrast value P[PN] is smaller than this minimum value (if YES at step S107), the minimum value is set to this contrast value P[PN] (step S109). Such operations for calculating and comparing the contrast value P[PN] at steps S101 through S109 are repeated to be performed on each of the five areas 0 through 4. After the completion of the operations at steps S101 through S109 on all the areas 0 through 4, control returns.

[Peak Check Process]

Figure 6:
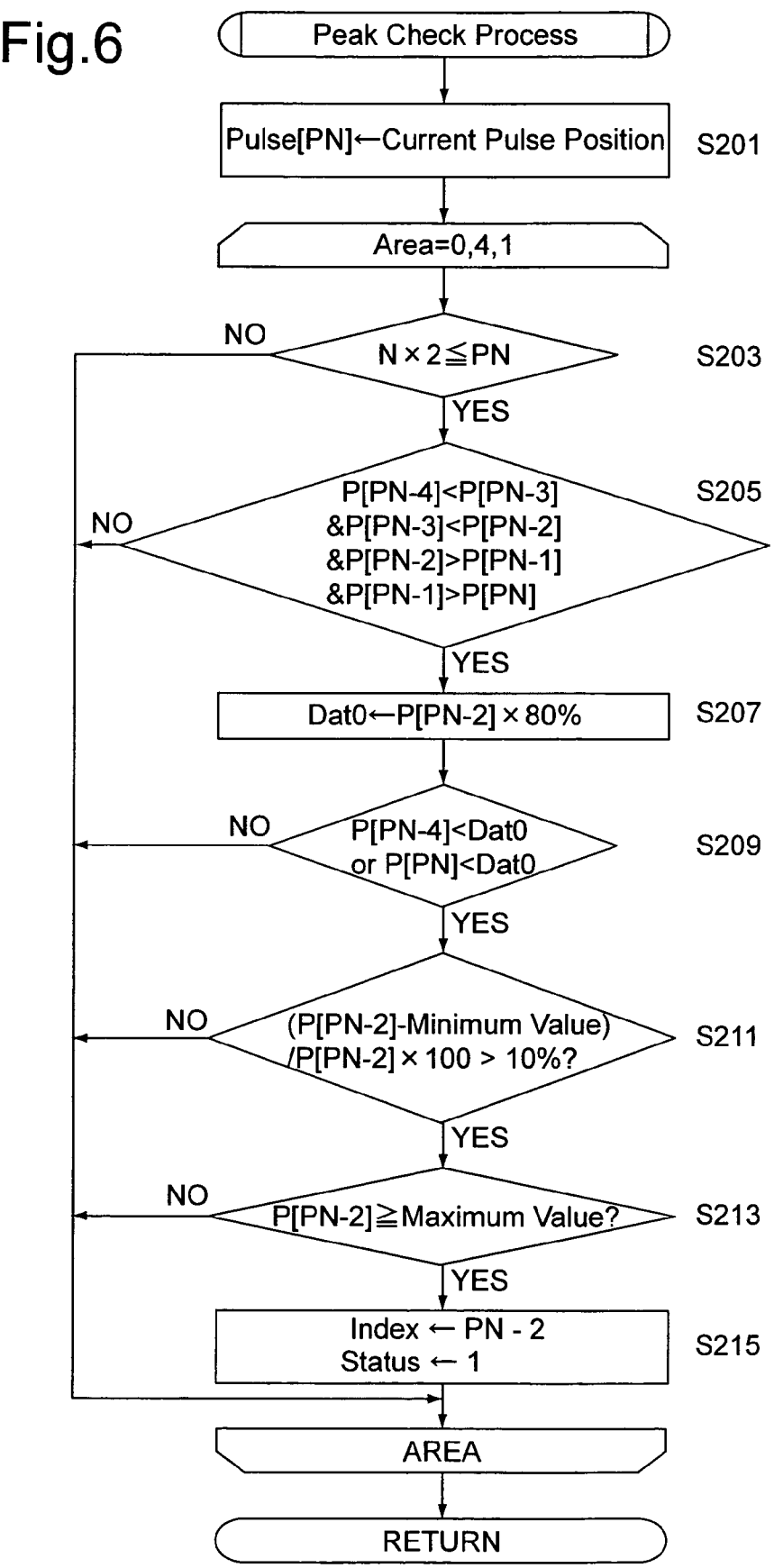
FIG. 6 is a flow chart showing a sub-routine "Peak Check Process" performed in the contrast AF process shown in FIG. 4.

The peak (maximum value) check process that is performed at step S23 will be hereinafter discussed in detail with reference to the flow chart shown in FIG. 6. In the peak check process, a peak value (maximum value) of contrast is determined, on each of the five areas 0 through 4, from the contrast values P[PN] which are obtained at each lens position of the focusing lens group L1 (lens position PN) by moving the focusing lens group L1 stepwise. In the present embodiment of the focus detection method, the contrast values P[PN] obtained at two adjacent lens positions are compared with each other in a group of five contrast values P[PN] obtained at consecutive five lens positions from the closest (shortest) focus position to the infinite focus position to determine whether the contrast value increases a first predetermined number of times consecutively and subsequently decreases a second predetermined number of times consecutively. Specifically, if it is determined that the contrast value increases two times consecutively and subsequently decreases two times consecutively, the maximum contrast value P[PN] at this time is determined as a peak contrast value (maximum contrast value).

In the peak check process, firstly a lens position pulse Pulse[PN] is set to the current lens position (pulse number) PN of the focusing lens group L1 (step S201). When control firstly enters the peak check process, the lens position pulse Pulse[PN] is set to zero (0) representing the closest focus position.

Subsequently, it is determined whether the lens position PN is equal to or greater than "N×2" (step S203). "N" represents a predetermined number of times by which it is determined whether or not the contrast has consecutively increased and consecutively decreased. In this particular embodiment "N" is set to two. Therefore, if the lens position PN is not equal to or greater than four (4≦PN) (if NO at step S203), control proceeds to the subsequent area, or control returns in the case of the last area 4. If the lens position PN is equal to or greater than four (if YES at step S203), it is determined whether the contrast value P[PN] increases two times (since "N" is set to two) consecutively and subsequently decreases two times (since "N" is set to two) consecutively on the most-recent five contrast values from the current contrast value to a previous contrast value four positions (focus detection areas) behind the current contrast value (step S205). If the contrast value P[PN] does not increase two times consecutively and subsequently decrease two times consecutively on the group of the most-recent five contrast values (if NO at step S205), control proceeds to the subsequent area, or control returns in the case of the last area 4. When control returns, an image data is obtained to determine a contrast by moving the focusing lens group L1 toward the infinite focus position by one pulse, and thereafter control enters the flow chart shown in FIG. 6 again with the contrast data on the five areas 0 through 4 having been updated.

If the contrast value P[PN] increases two times consecutively and subsequently decreases two times consecutively on the group of the most-recent five contrast values P[PN−4] through P[PN] (if YES at step S205), a value corresponding to 80 percent of the contrast value P[PN−2] at the lens position (PN−2) (at which the contrast value is the maximum contrast value) is determined, and a lower limit value dat0 is set to this value (step S207). Subsequently, it is determined, as the first condition for reliability, whether either one of the two contrast values P[PN−4] and P[PN] at the opposite ends of the most-recent five contrast values, which determine the maximum contrast value, is smaller than the lower limit value dat0 (step S209). Namely, it is determined whether or not the difference between the peak contrast value and either one of the two contrast values at the opposite ends of the most-recent five contrast values is sufficiently large. If either one of the two contrast values P[PN−4] and P[PN] at the opposite ends of the most-recent five contrast values is not smaller than the lower limit value dat0 (if NO at step S209), control returns (control proceeds to the subsequent area, or control returns in the case of the last area 4). This is because the contrast varies only by a small amount, and accordingly it is assumed that the reliability of the obtained contrast data is low.

If it is determined that either one of the two contrast values P[PN−4] and P[PN] at the opposite ends of the most-recent five contrast values is smaller than the lower limit value dat0 (if YES at step S209), it is determined, as a second condition for reliability, whether the difference between the peak contrast value P[PN−2] and the minimum value of the contrast values obtained so far is greater than 10 percent of the peak contrast value P[PN−2] (step S211). If the difference between the peak contrast value P[PN−2] and the minimum value of the contrast values obtained is not greater than 10 percent of the peak contrast value P[PN−2] (if NO at step S211), control returns (control proceeds to the subsequent area, or control returns in the case of the last area 4) because the peak contrast value is so low that the reliability of the obtained contrast data can be assumed to be low.

If the difference between the peak contrast value P[PN−2] and the minimum value of the contrast values obtained is greater than 10 percent of the peak contrast value P[PN−2] (if YES at step S211), it is determined, as a third condition for reliability, whether the peak contrast value P[PN−2] is equal to or greater than the maximum value of the contrast values obtained so far; namely, it is determined whether the peak contrast value P[PN−2] is the greatest among all the detected contrast values (step S213).

If it is determined that the contrast value P PN[−2] is equal to or greater than the maximum contrast value of all the detected contrast values (if YES at step S213), a position index "Index" is set to the lens position (PN−2) at which the peak contrast value P[PN−2] has been obtained, and a peak existence flag "Status" is set to one (step S215). Subsequently, control proceeds to the subsequent area, or control returns in the case of the last area 4.

Note that the aforementioned position index "Index" indicates the lens position PN at which the peak contrast value P[PN−2] has been obtained, and the peak existence flag "Status" is a flag which identifies that a peak value (maximum value) of contrast has been obtained.

If it is determined that the peak contrast value P[PN−2] is not equal to or greater than the maximum contrast value of all the detected contrast values (if NO at step S213), namely, if it is determined that a contrast value greater than the peak contrast value P[PN−2] exists, control simply returns (control proceeds to the subsequent area, or control returns in the case of the last area 4). This is because there is a high possibility of the lens position, at which the peak contrast value P[PN−2] has been obtained, not being at an in-focus position.

Since the above described peak check process makes it possible to determine whether a peak contrast value is reliable by checking whether the contrast value increases two times consecutively and subsequently decreases two times consecutively on a group of contrast data obtained at consecutive five lens positions, a peak contrast value can be detected with a high degree of precision.

[Peak Calculation Process]

Figure 7:
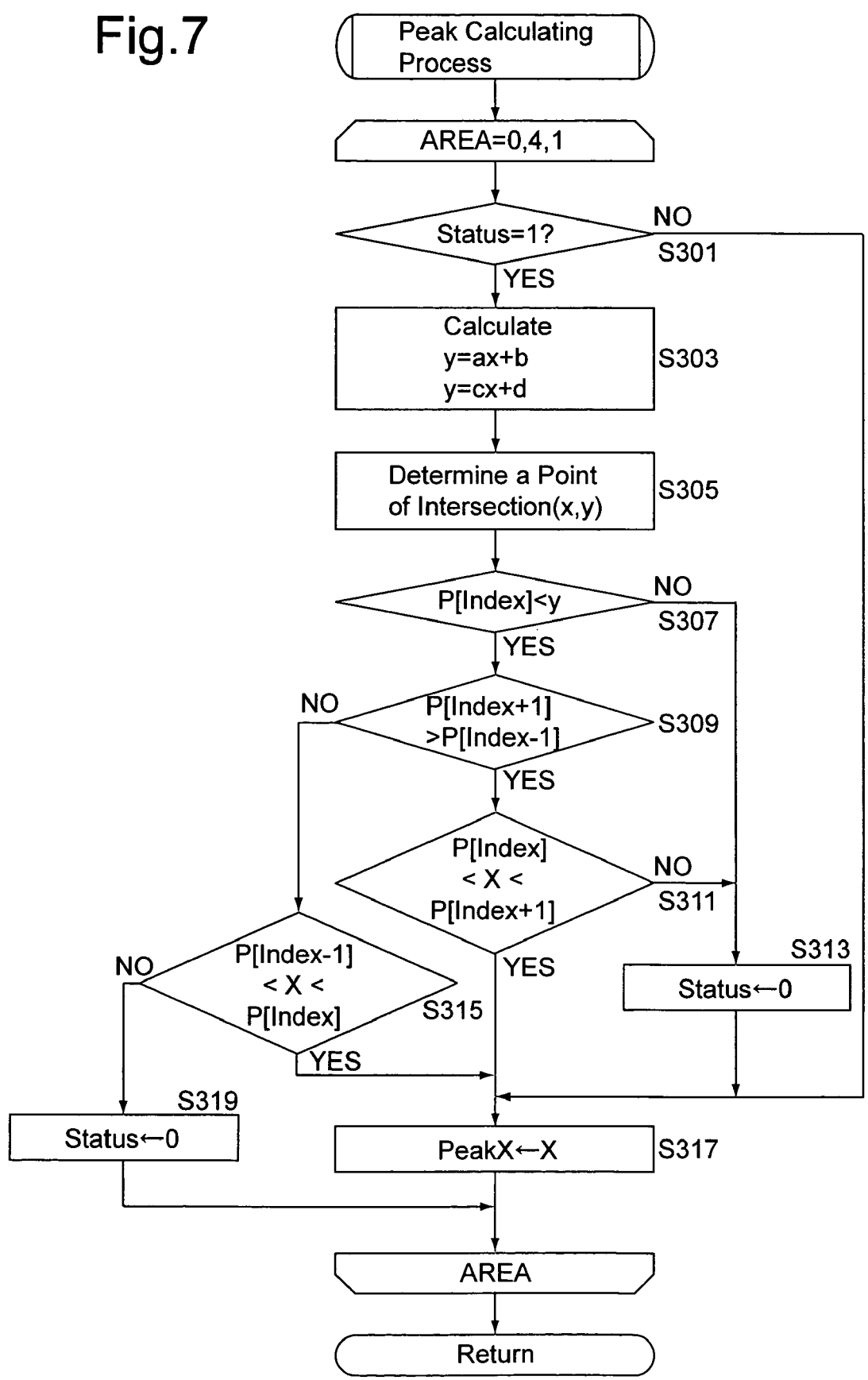
FIG. 7 is a flow chart showing a sub-routine "Peak Calculation Process" performed in the contrast AF process shown in FIG. 4.

The peak calculation process that is performed at steps S29 and S421 will be hereinafter discussed in detail with reference to the flow chart shown in FIG. 7. In the peak calculation process, a more precise peak contrast value is determined by an approximate (interpolation) calculation using contrast values on the opposite sides of the peak contrast value P[PN] obtained at step S23.

A linear approximation expression (straight line) which passes through the point of a maximum contrast value (detected maximum contrast value) among the detected contrast values and the point of another contrast value obtained on the close-distance side, and another linear approximation expression (straight line) which passes through the points of two contrast values obtained on the infinite range side with respect to the point of the peak contrast value, are determined to obtain the point of intersection between the straight lines of these two linear approximation expressions. The x-coordinate of the point of intersection of the two straight lines is determined as a focus lens position of the focusing lens group (focused focal point) if the value of the y-coordinate (determined maximum contrast value) of the point of intersection of the two straight lines is greater than the detected maximum contrast value.

In the peak calculation process, firstly it is determined whether the peak existence flag "Status" is one, i.e., whether there is a peak contrast value (step S301). If the peak existence flag "Status" is not one (if NO at step S301), the peak calculation process is performed for the subsequent area. If the peak existence flag "Status" is 1 (if YES at step S301), a linear approximation process which includes operations at and after step S303 is performed. In this linear approximation, in regard to a straight line (Y=ax+b) which passes through the points of two contrast values including a peak contrast value and another straight line (Y=cx+d) which passes through the points of two contrast values including no peak value, gradients a and c and intersections b and d of the two straight lines are determined (step S303), and the x and y coordinates of the point of intersection of the two straight lines respectively determined by the two equations (Y=ax+b and Y=cx+d) are determined (step S305). The y-coordinate of the point of intersection is determined as a determined peak contrast value y, while the x-coordinate of the intersection is determined as a determined contrast-peak lens position x.

Figure 11A:
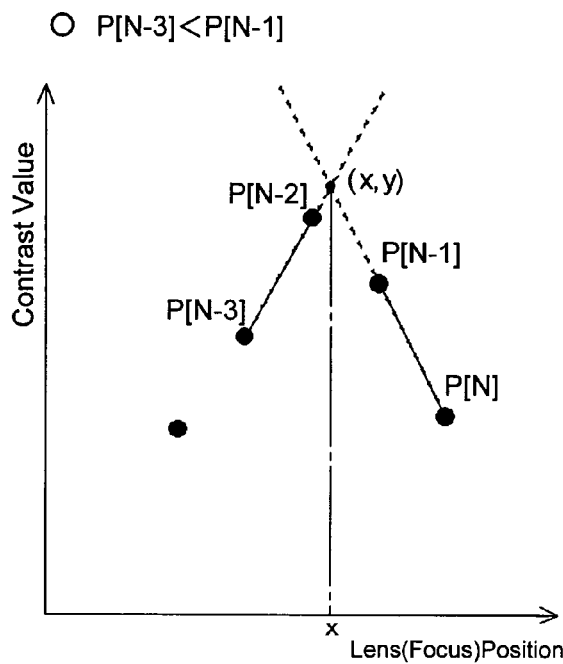
FIGS. 11A through 11D are graphs each illustrating the linear approximation of a peak contrast value in the contrast AF process shown in FIG. 4.
Figure 11B:
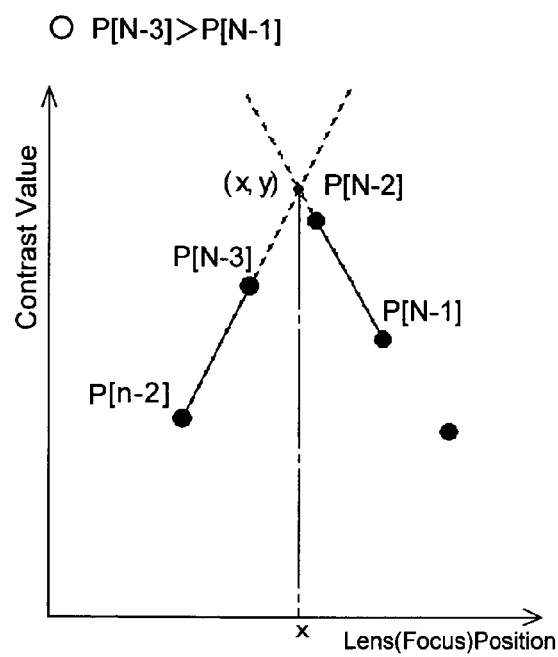
Figure 11C:
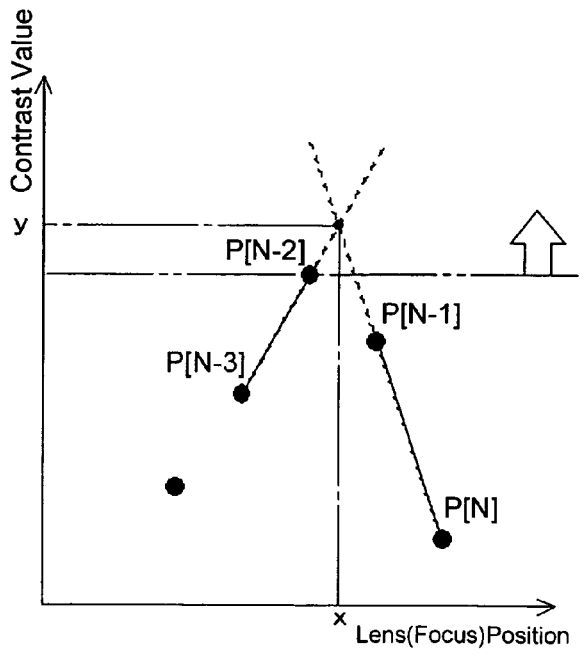
Figure 11D:
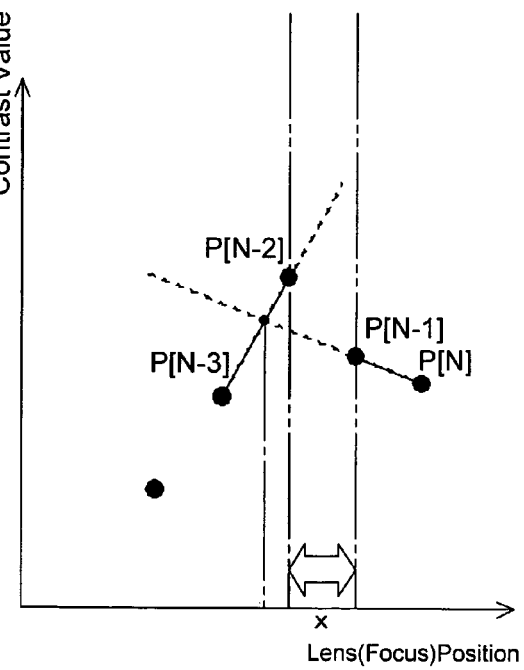

Subsequently, it is determined whether the peak contrast value P[Index] is smaller than the determined peak contrast value y (step S307). If the peak contrast value P[Index] is smaller than the determined peak contrast value y (if YES at step S307), operations at and after step S309 are performed. If the peak contrast value P[Index] is not smaller than the determined peak contrast value y (if NO at step S307), the peak existence flag "Status" is set to zero indicating that there is no peak contrast value (step S313). FIG. 11D corresponds to this case. When the peak contrast value P[Index] is smaller than the determined peak contrast value y, i.e., when the determined peak contrast value y is greater than the peak contrast value P[Index], the determined peak contrast value y is assumed to be a more precise peak value.

If the peak contrast value P[Index] is smaller than the determined peak contrast value y (if YES at step S307), the contrast value P[Index−1] and the contrast value P[Index+1] which are positioned on the opposite sides of the peak contrast value P[Index] are compared with each other to determine whether the contrast value P[Index+1] is greater than the contrast value P[Index−1] (step S309). FIGS. 11A, 11B and 11C correspond to this case.

It is determined at step S309 whether the contrast value P[Index+1], which is positioned closer to the long-distance side than the peak contrast value P [Index], is greater than the contrast value P[Index−1], which is positioned closer to the close-distance side than the peak contrast value P[Index], and it is determined at step S311 whether an approximate peak point X is greater than the peak contrast value P[Index] and smaller than the contrast value P[Index+1], which is positioned closer to the long-distance side than the peak contrast value P[Index]. If the contrast value P[Index+1] is greater than the contrast value P[Index−1] (if YES at step S309) and further if the approximate peak point X is greater than the peak contrast value P[Index] and smaller than the contrast value P[Index+1] (if YES at step S311), a peak position PeakX is set to the approximate peak point X (step S317). FIGS. 11A and 11C correspond to this case.

If the contrast value P[Index+1] is greater than the contrast value P[Index−1] (if YES at step S309) and if the approximate peak point X is not greater than the peak contrast value P[Index] and smaller than the contrast value P[Index+1] (if NO at step S311), the peak existence flag "Status" is set to zero indicating that there is no peak contrast value (step S313).

If the contrast value P[Index+1] is not greater than the contrast value P[Index−1] (if NO at step S309) and if the approximate peak point X is greater than the contrast value P[Index−1] and smaller than the peak contrast value P[Index] (if YES at step S315), the peak position PeakX is set to the approximate peak point X (step S317). FIG. 11B corresponds to this case.

If the contrast value P[Index+1] is not greater than the contrast value P[Index−1] (if NO at step S309), and if the approximate peak point X is not greater than the contrast value P[Index−1] and smaller than the peak contrast value P[Index] (if NO at step S315), the peak existence flag "Status" is set to zero (step S319).

The above described operations at steps S301 through S319 are repeated for each peak contrast value P[Index], and further repeated for each of the five areas 0 through 4 to determine a peak contrast value which is assumed to be a real peak contrast value calculated by linear approximation.

[Area Selection Process]

The area selection process that is performed at step S31 will be hereinafter discussed in detail with reference to the flow chart shown in FIG. 8.

In the area selection process, firstly an error flag "Error", for determining whether a valid peak contrast value has been obtained, is set to one (step S401). Subsequently, it is determined whether the peak existence flag "Status" is one (step S403), and it is determined whether there is no error (step S405). If the peak existence flag "Status" is one (if YES at step S403) and if there is no error (if YES at step S405), the error flag "Error" is cleared (step S407), and control proceeds to step S409. In the other cases (if NO at step S403 or if NO at step S405), control skips the operation at step S407 to proceed to step S409.

It is determined at step S409 whether the error flag "Error" is zero. If the error flag "Error" is zero (if YES at step S409), the peak position PeakX which has been set at step S317 is converted into driving pulses (step S411) because the peak existence flag "Status" is one and there is no error. Subsequently, control returns.

If it is determined at step S409 that the error flag "Error" is not zero (if NO at step S409), a proximity determination process (see FIG. 9) is performed (step S413). In the proximity determination process, it is determined whether a peak contrast value exists at a closest focusing distance of the focusing lens group L1 (closest focusing distance/predetermined position) or in the close vicinity thereof. If a peak contrast value exists at the closest focusing distance or in the close vicinity thereof (if YES at step S415), the lens position (pulse number) PN in which this peak contrast value has been obtained is converted into driving pulses (step S417), and control returns. If a peak contrast value does not exist at the closest focusing distance or in the close vicinity thereof (if YES at step S415), a normal error process is performed (step S419), and control returns.

[Proximity Determination Process]

The proximity determination process that is performed at step S413 will be hereinafter discussed in detail with reference to the flow chart shown in FIG. 9.

In this process, firstly a flag F_TooNear is set to zero (step S501). The flag F_TooNear is a flag for determining whether an object to be photographed is located at a distance closer than the closest focusing distance corresponding to the closest focusing position of the focusing lens group L1. The flag F_TooNear is set to one if an object to be photographed is located at a distance closer than the closest focusing distance. Subsequently, it is determined whether the maximum value position index MaxIndex determined at step 105 is either zero or one (step S503). FIG. 10B shows the case where the flag F_TooNear is one, while FIG. 10C shows the case where the flag F_TooNear is zero.

If the maximum value position index MaxIndex is either zero or one (if YES at step S503), data dat0 is set to a contrast value P[MaxIndex] of the maximum value position index MaxIndex, and data dat1 is set to a contrast value P[MaxIndex+2] two lens position pulses away from the maximum value position index MaxIndex (step S505). Subsequently, it is determined whether the following condition is satisfied (step S507):

$$dat1/dat0 < d[\%]$$

If this condition is satisfied (if YES at step S507), the flag F_TooNear is set to one, and control returns. If this condition is not satisfied (if NO at step S507), control simply returns. Namely, the reliability of the contrast data is checked by determining whether the difference between a maximum contrast value and a contrast value adjacent thereto is great and whether an inclination therebetween is great. If the maximum value position index MaxIndex is not either zero or one (if NO at step S503), control simply returns. Thereafter, in the case where the flag F_TooNear has been set to one at step 509, the LED 29 illuminates or blinks in a manner to indicate that focus is not achieved because there is a possibility of an object to be photographed being located so close to the camera that the object may be out of focus.

As can be understood from the above description, according to the present embodiment of the focus detection method, in the case where a peak contrast value cannot be obtained from image data obtained over the range of movement of the focusing lens group L1 from the closest focusing position to the infinite focus position of the focusing lens group L1, it is determined whether a contrast value obtained at a position of the focusing lens group L1 a distance of one pulse away from the closest focusing position toward the infinite focus position is a maximum contrast value, and the focusing lens group L1 is moved to the position of the focusing lens group L1 a distance of one pulse away from the closest focusing distance toward the infinite focus position if the contrast value is a maximum contrast value, and accordingly, an object to be photographed can be brought to an in-focus state or brought close thereto.

Additionally, in the case where a peak contrast value is detected at a position away from the closest focusing distance toward the infinite focus position in the proximity determination process, there is a high possibility of a correct in-focus state being obtained, so that the LED 29 can be made to illuminate in a manner to indicate that focus is achieved.

Although in the illustrated embodiment, whether or not a peak contrast value exists is determined by two lens positions, i.e., the closest focusing distance and a position at a distance of one pulse away from the closest focusing distance toward the infinite focus position, the lens position pulse at which a peak contrast value is determined in the proximal determination process is set in accordance with conditions for selecting a peak contrast value.

For instance, although the lens position pulse at which a peak contrast value only has to be determined from the contrast at the closest focusing distance in the case where the determination of whether the lens position pulse increases by one pulse and decreases by a plurality of pulses from the closest focusing distance side to the infinite focus position side is a condition to be satisfied, in the case where the determination of whether the lens position pulse increases by "t" pulses and decreases by a plurality of pulses from the closest focusing distance side to the infinite focus position side is a condition to be satisfied, the lens position pulse at which a peak contrast value is determined from the total number of pulses "t", namely, the closest focusing distance and a long distance position at a distance of the lens position pulse t−1 away from the closest focusing distance toward the infinite focus position.

Although the ratio between the maximum contrast value and a contrast value on the long distance side is used in the above described embodiment, influence of the dark current component can be avoided by using the ratio between the maximum contrast value from which a minimum contrast value is subtracted and the contrast value on the long distance side from which the minimum contrast value is subtracted.

Although it is determined whether a peak contrast value exists at the closest focusing distance or in the vicinity thereof on contrast data obtained from the first (central) focus detection area 12A (the area 0) unless the user selects any of the focus detection areas 12A through 12E in the proximity determination process in the above described embodiment of the focus detection method, it can be determined whether a peak contrast value exists at the closest focusing distance or in the vicinity thereof on contrast data obtained from all the five focus detection areas 12A through 12E (the five areas 0 through 4). In this case, if peak values of contrast are obtained from more than one of the five areas 0 through 4, a position of the focusing lens group L1 in which the greatest number of peak values of contrast is obtained can be selected, or the closest focusing position of the focusing lens group L1 in which at least one peak contrast value is obtained can be selected.

In the illustrated embodiment, the contrast is calculated when the focusing lens group L1 is positioned at the closest (shortest) focus position, however, the present invention can be applied to the case where the contrast is calculated when the focusing lens group L1 is positioned at an infinite-focus position. In other words, when the contrast, attained when the focusing lens group L1 is positioned at the infinite-focus position or at a position within a predetermined range of steps from the infinite-focus position toward the closest focus position, is at a maximum contrast value, the position of the focusing lens group L1 which is determined by the maximum contrast value is determined as the in-focus position. Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A focus detection method for detecting a focus state of an object image in accordance with a contrast of the object image that is formed in a focus detection area, the focus detection method comprising:

capturing a plurality of object images while moving a focusing lens group of a photographing lens stepwise within a predetermined range of movement of said focusing lens group;

determining contrast values of the plurality of object images in the focus detection area;

determining whether a contrast value of the contrast values of the plurality of object images is a peak contrast value, wherein a particular contrast value is determined to be a peak contrast value when a first predetermined number of consecutive contrast values preceding the particular contrast value increase in value and a second predetermined number of consecutive contrast values succeeding the particular contrast value decrease in value, the determination being made when the focusing lens group is moved stepwise in a predetermined direction; and moving the focusing lens group to a position in which a maximum contrast value is determined when a peak contrast value is not detected, the maximum contrast value being determined at one of at the closest focusing position and within a close vicinity of the closest focusing position.

2. The focus detection method according to claim 1, the determining further comprising comparing contrast data at adjacent lens positions of the focusing lens group along a direction of movement of the focusing lens group.

3. The focus detection method according to claim 1, the determining during movement of the focusing lens group from the closest focusing position to the infinite focusing position comprising determining whether any of the contrast values detected at the closest focusing position and at a position a predetermined distance away from the closest focusing position in the direction of the infinite focusing position are less than a contrast value of any of the first predetermined number of consecutive contrast values.

4. The focus detection method according to claim 1, the determining during movement of the focusing lens group from the infinite focusing position to the closest focusing position comprising determining whether any of the contrast values detected at the closest focusing position and at a position a predetermined distance away from the closest focusing position in the direction of the infinite focusing position are less than a contrast value of any of the first predetermined number of consecutive contrast values.

5. The focus detection method according to claim 3, further comprising determining that the maximum contrast value is valid when a ratio between the maximum contrast value and a contrast value detected at a position of the focusing lens group that is two steps away from the closest focusing position in a direction toward the infinite focusing position is less than a predetermined value, wherein the first predetermined number is two.

6. The focus detection method according to claim 4, further comprising determining that the maximum contrast value is valid when a ratio between the maximum contrast value and a contrast value detected at a position of the focusing lens group that is two steps away from the focusing lens group position at which the maximum contrast value is detected in a direction toward the closest focusing position is less than a predetermined value, wherein the first predetermined number is two.

7. The focus detection method according to claim 1, further comprising visually indicating that an in-focus state is not achieved when moving the focusing lens group to the position at which the maximum contrast value is detected.

8. The focus detection method according to claim 7, further comprising visually indicating that an in-focus state is achieved if the maximum contrast value is determined at a position of the focusing lens group that is closer to the infinite focusing position than to the closest focusing position and it is determined that the maximum contrast value is valid.

9. The focus detection method according to claim 1, wherein the focus detection area is selected from a plurality of focus detection areas.

10. The focus detection method according to claim 7, wherein an out-of-focus state is visually indicated by a light emitting element when an in-focus state is not achieved.

11. The focus detection method according to claim 7, wherein an out-of-focus state is visually indicated on a display device when an in-focus state is not achieved.

12. The focus detection method according to claim 1, wherein the contrast values of the object images are measured by an image pickup device.

13. A focus detection apparatus for detecting a focus state of an object image in accordance with a contrast of the object image that is formed in a focus detection area, the focus detection apparatus comprising:
   a lens drive mechanism configured to move a focusing lens group of a photographing lens system within a predetermined range of movement;
   an image-capturing device for capturing a plurality of object images while moving the focusing lens group of a photographing lens stepwise within a predetermined range of movement of the focusing lens group;
   a contrast value determining device configured to determine a plurality of contrast values of the plurality of object images in the focus detection area; and
   a controller configured to detect whether a contrast value of the contrast values of the plurality of object images is a maximum contrast value, which are determined when the focusing lens group is moved stepwise in a predetermined direction, is a peak contrast value; and
   the lens driving mechanism further configured to move the focusing lens group to a position in which a maximum contrast value is determined when a peak contrast value is not detected, the maximum contrast value being determined at one of at the closest focusing position and within a close vicinity of the closest focusing position.

* * * * *